US005859650A

United States Patent [19]
Shiraishi

[11] Patent Number: 5,859,650
[45] Date of Patent: Jan. 12, 1999

[54] GRAPHIC CONTROLLING PROCESSOR

[75] Inventor: Naoto Shiraishi, Toyonaka, Japan

[73] Assignee: Ricoh Company, Ltd., Tokyo, Japan

[21] Appl. No.: 802,568

[22] Filed: Feb. 19, 1997

[30] Foreign Application Priority Data

Feb. 19, 1996 [JP] Japan .................................... 8-030494

[51] Int. Cl.$^{6}$ ...................................................... G06F 12/00
[52] U.S. Cl. ........................... 345/514; 345/509; 711/173
[58] Field of Search ..................................... 345/514, 302, 345/505, 508, 509, 516; 348/402; 711/170, 173, 5; 400/68; 395/115, 116

[56] References Cited

U.S. PATENT DOCUMENTS 5,156,468 10/1992 Uematsu .................................. 400/68
5,335,316 8/1994 Toyokura ................................ 395/115
5,485,554 1/1996 Lowitz et al. .......................... 395/116
5,751,988 5/1998 Fujimura .................................... 711/5

*Primary Examiner*—Kee M. Tung
*Assistant Examiner*—Sy Danh Luu
*Attorney, Agent, or Firm*—Oblon, Spivak, McClelland, Maier & Neustadt, P.C.

[57] ABSTRACT

A graphic controlling processor includes a frame memory for storing graphic data for displaying a graphic image, wherein the frame memory is divided into territories. A graphic controller controls to display the graphic image based on the graphic data and to clear the frame memory. A control flag may be added to the graphic data for differentiating a frame number, and the graphic data may then be cleared from one of each of the territories in one frame cycle based on the control flag. This graphic controlling processor provides enough time for displaying the graphic image with high graphic quality.

10 Claims, 5 Drawing Sheets

"1"

"2"

"3"

"4"

"1"

GRAPHIC CONTROLLING PROCESSOR

BACKGROUND OF THE INVENTION

1. Field of the Invention

The present invention relates to a graphic controlling processor for a graphic display system.

2. Discussion of the Background

FIG. 1 is a block schematic diagram showing a general background graphic display system. The graphic display system includes a display apparatus 4, such as a CRT display or a LCD display, which displays a graphic image, a frame memory 3 storing graphic data for displaying the graphic image, a graphic controller 2 controlling the display apparatus 4 based on the graphic data and a central processing unit (CPU) 1 controlling the graphic controller 2. For the frame memory 3, a dual port RAM (for example, VRAM) or a single port RAM can be used. If a single port RAM is used, it is necessary that all three processing's of a data reading processing, a data writing processing and a data clear processing are completed in one frame cycle. The data writing processing functions to store the graphic data in the frame memory 3. The data reading processing functions to move the graphic data stored in the frame memory 3 to the display apparatus 4. The data clear processing functions to clear the graphic data stored in the frame memory 3 for a next data reading processing.

As shown in FIG. 2, as an example, the frame memory 3 may be divided into two territories (each territory is made of one frame of memory volume). The graphic data for displaying the graphic image is read out from one territory (for example, M0) of the frame memory 3 by one scanning line, then the graphic data is moved to an unillustrated line memory, then the graphic data is written into another territory (for example, M1) of the frame memory 3, and the data read out from the one territory (for example, M0) is then cleared. In the background device all of these processes need to be finished in one frame cycle. In a next frame cycle, graphic data for displaying a graphic image is read out from the other territory (for example, M1), and then the next graphic data is written into the one territory (for example, M0).

FIG. 3 shows a display period and a blanking period B in a frame cycle. FIG. 4 shows a data reading processing time R, a data writing processing time W and a data clear processing time C, for FIG. 3. The sum of the data reading processing time and the data writing processing is a time for displaying the graphic image. For graphic quality, a large enough time for displaying the graphic image is needed. However, the time for displaying the graphic image is reduced by the data clear processing time C.

SUMMARY OF THE INVENTION

In view of the foregoing drawbacks in the background graphic controlling processor, one object of the present invention to provide a novel graphic controlling processor that provides enough time for displaying the graphic image, to enhance graphic quality.

In accordance with the present invention, this object of the present invention is attained by a novel graphic controlling processor including a frame memory for storing graphic data for displaying a graphic image, the frame memory being divided into territories, and a graphic controller for controlling to display the graphic image based on the graphic data and to clear the frame memory. Further, a control flag may be added to the graphic data for differentiating a frame number, and the graphic data is then cleared from one of each of the territories in one frame cycle based on the control flag.

According to the present invention, this novel graphic controlling processor has enough time for displaying the graphic image, with high graphic quality.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
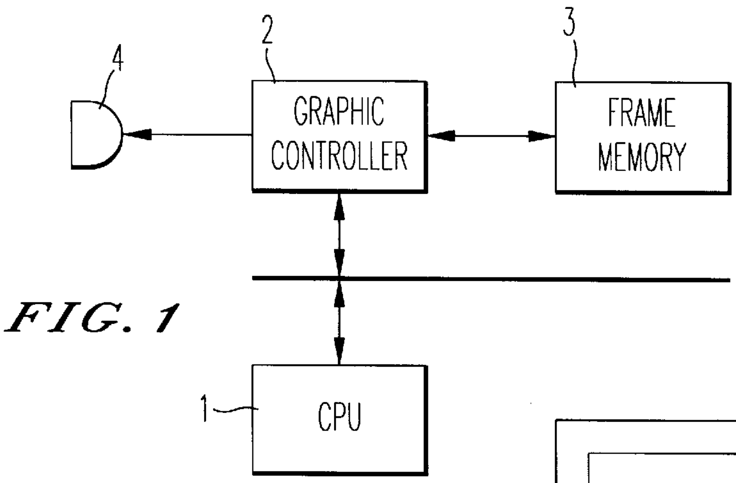
FIG. 1 is a block schematic diagram showing a general background graphic display system.
Figure 3:
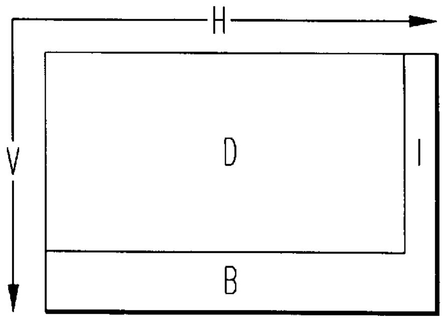
FIG. 3 shows a display period and a blanking period in a frame cycle.
Figure 2:
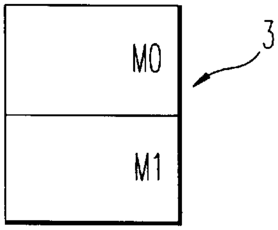
FIG. 2 shows the frame memory 3 of FIG. 1 divided into two territories (each territory being made of one frame of memory volume)
Figure 4:
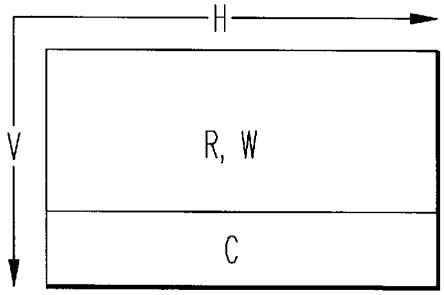
FIG. 4 shows a data reading processing time, a data writing processing time and a data clear processing time, for FIG. 3.
Figure 5:
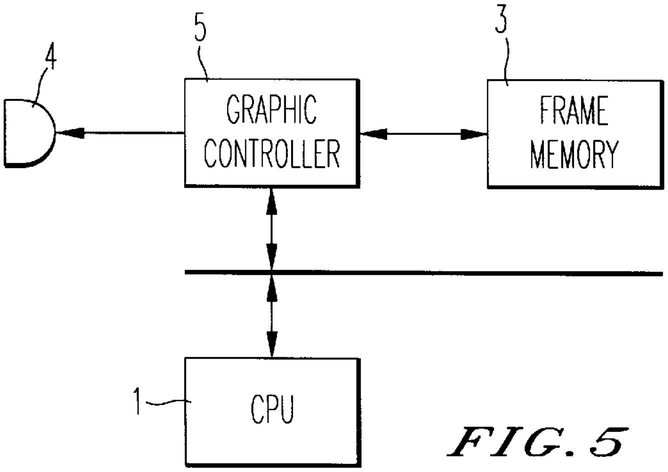
FIG. 5 is block schematic diagram showing a graphic display system used as an embodiment of the present invention.

Referring now to the drawings, wherein like reference numerals designate identical or corresponding parts throughout the several views, and more particularly to FIG. 5 thereof, one embodiment of the present invention is now described in further detail.

FIG. 5 is block schematic diagram showing a graphic display system used as one embodiment of the present invention. FIG. 5 shows a display apparatus 4, such as a CRT display or a LCD display, for displaying a graphic image, a frame memory 3 storing graphic data for displaying the graphic image, a graphic controller 5 controlling the display apparatus 4 based on the graphic data and a central processing unit (CPU) 1 controlling the graphic controller 5.

Figure 6:
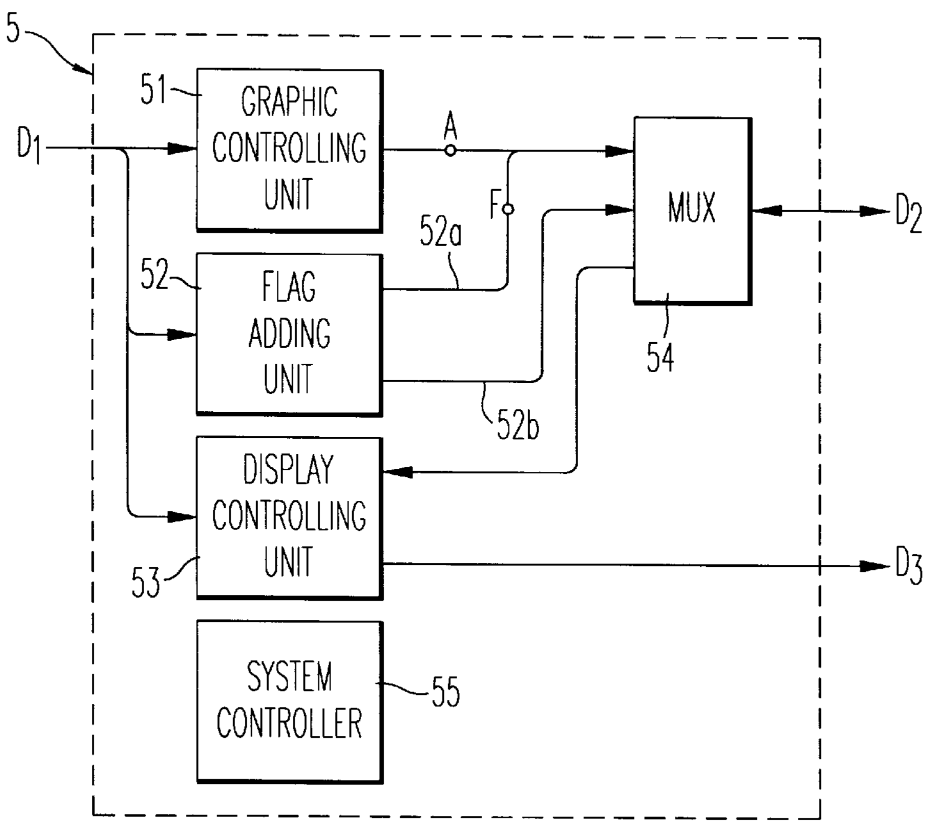
FIG. 6 is a block schematic diagram showing a graphic controller of an embodiment of the present invention.
Figure 10:
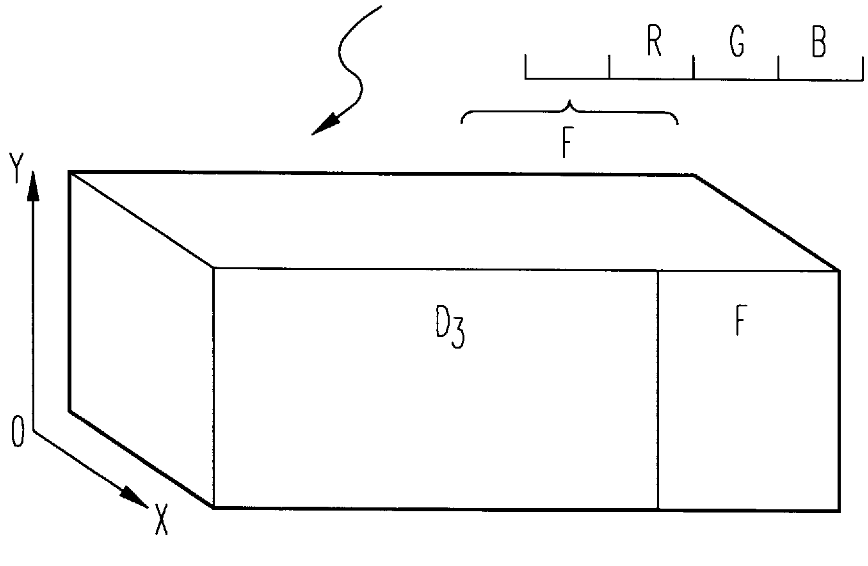
FIG. 10 shows an operation of adding control flags of an embodiment of the present invention.

FIG. 6 is block schematic diagram showing the graphic controller 5. FIG. 6 shows a graphic controlling unit 51, a flag adding unit 52, a display controlling unit 53, a MUX 54 and a system controller 55. Further, D1 is a CPU data bus, D2 is a frame memory data or address data, etc., D3 is R, G, B or LUT address and F is a control flag. The system controller 55 controls all of the elements of the graphic controller 5. The graphic controlling unit 51, under control of CPU 1, stores the graphic data in the frame memory 3. FIG. 10 shows how to add control flags using signal line 52*a* for adding a control flag. The control flag is selected from a number between 1 and N, in a case that a display screen at display equipment 4 considers that the frame memory 3 has a division number of N (where N is an integer) territories. As an example, a number of territories of frame memory 3 is 4, i.e. N=4, and any control flag takes a number between 1 and 4. This number taken by the control flag is changed by one frame time. Another control flag meaning clear is "0". Flag adding unit 52 adds the control flag to the graphic data. The control flag is thus one of the numbers of the division of the frame memory 3 into territories. The display controlling unit 53 reads out the graphic data from the frame memory 3, generates R, G, B data, HSYN, VSYN, and sends such to the display apparatus 4.

Figure 7:
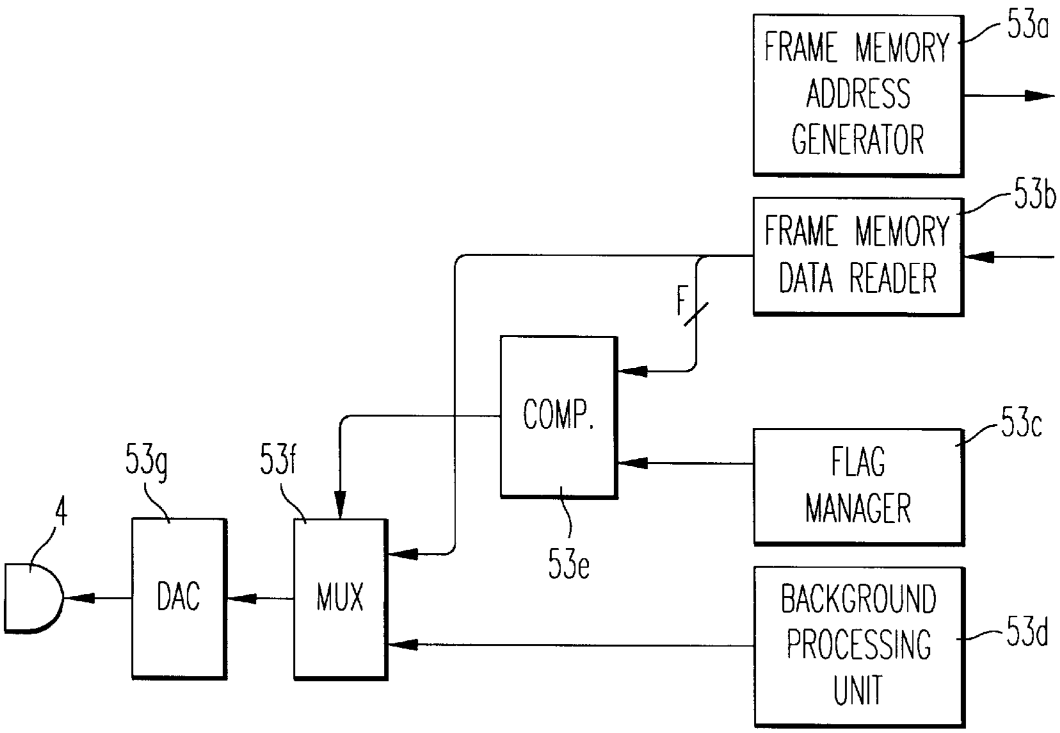
FIG. 7 is a block schematic diagram showing a display controlling unit 53 as one example.
Figure 8A:
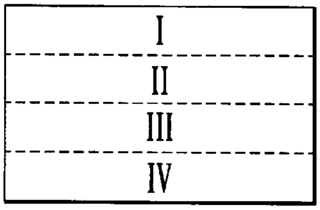
FIGS. 8(*a*)–8(*p*) explain operations of the graphic controller of an embodiment of the present invention.
Figure 8B:
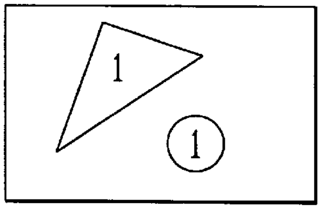
Figure 8C:
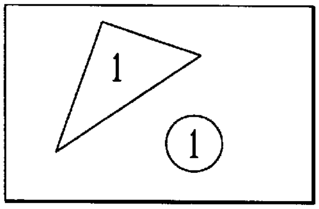
Figure 8D:
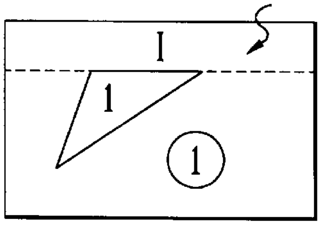
Figure 8E:
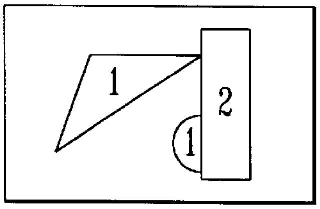
Figure 8F:
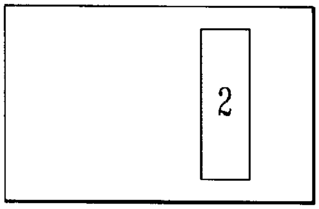
Figure 8G:
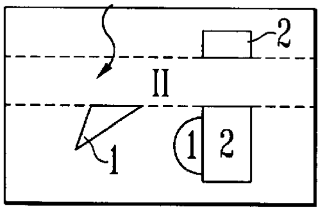
Figure 8H:
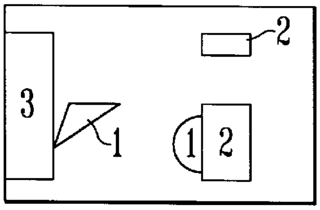
Figure 8I:
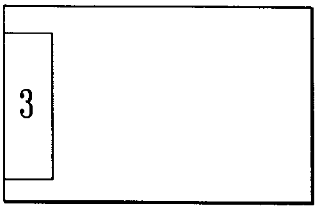
Figure 8J:
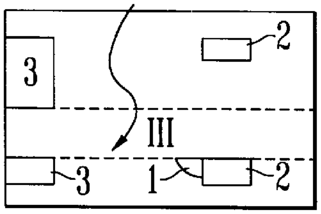
Figure 8K:
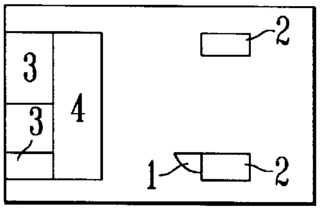
Figure 8L:
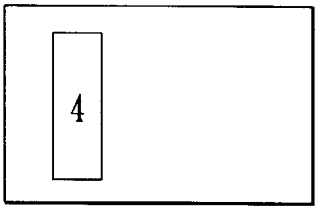
Figure 8M:
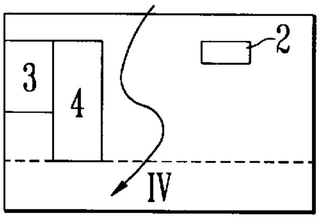
Figure 8N:
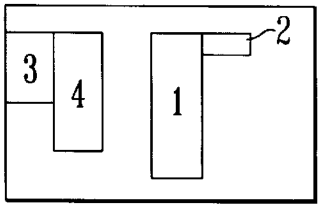
Figure 8O:
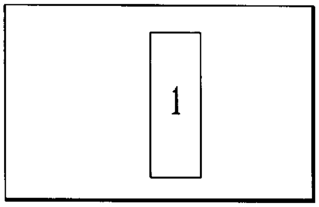
Figure 8P:
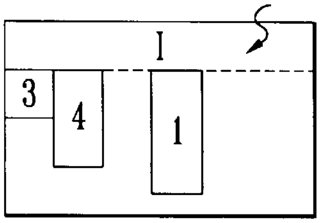

FIG. 7 is block schematic diagram showing a display controlling unit 53 as one example. As shown in FIG. 7, such a display controlling unit 53 includes a frame memory address generator 53*a,* a frame memory data reader 53*b,* a flag manager 53*c* and a background processing unit 53*d.* The display controlling unit 53 further includes a comparator 53*e,* a MUX 53*f* and a DAC 53*g.*

Referring to FIG. 8, operations of the graphic controller 5 are further explained.

FIG. 8(*a*) shows each frame memory being divided into four territories I–IV (i.e. N=4).

FIG. 8(*b*) shows graphic data stored in the memory wherein the control flag is "1". FIG. 8(*c*) shows a display wherein the control flag is "1". FIG. 8(*d*) shows graphic data after clearing of the memory wherein the control flag is "1".

FIG. 8(*e*) shows graphic data stored in the memory wherein the control flag is "2". FIG. 8(*f*) shows a display wherein the control flag is "2". FIG. 8(*g*) shows graphic data after clearing of the memory wherein the control flag is "2".

FIG. 8(*h*) shows graphic data stored in the memory wherein the control flag is "3". FIG. 8(*i*) shows a display wherein the control flag is "3". FIG. 8(*j*) shows graphic data after clearing of the memory wherein the control flag is "3".

Figure 9:
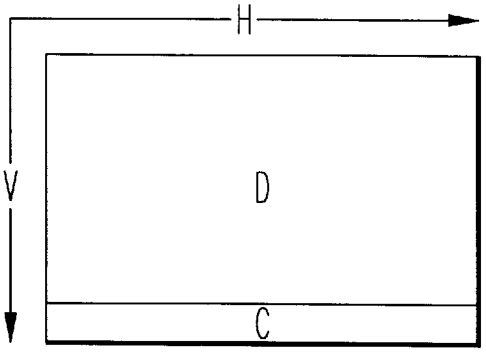
FIG. 9 shows a display period and a blanking period in a frame cycle of an embodiment of the present invention.

FIG. 8(*k*) shows graphic data stored in the memory wherein the control flag is "4". FIG. 9(*l*) shows a display wherein the control flag is "4". FIG. 8(*m*) shows graphic data after clearing of the memory wherein the control flag is "4".

FIG. 8(*n*) shows graphic data stored in the memory wherein the control is "1". FIG. 8(*o*) shows a display wherein the control is "1". FIG. 8(*p*) shows graphic data after clearing of the memory wherein the control is "1".

In this way of the operations shown in FIG. 8, the frame memory clearing process works in four frame periods, not in only one frame period. As a result, this graphic controlling process of the present invention has enough time for displaying the graphic image, with a high graphic quality. FIG. 9 shows a display period and a blanking period in a frame cycle in the embodiment of this invention as a result of the above-discussed operation. As shown in FIG. 9, the time C of the clearing operation is significantly reduced.

Figure 11:
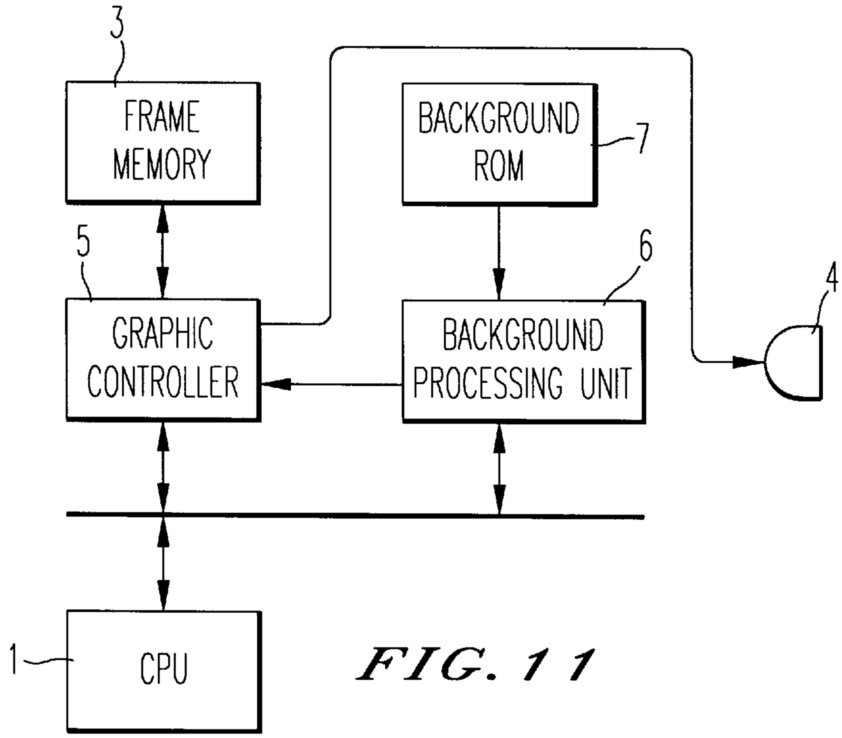
FIG. 11 is a block schematic diagram showing a graphic display system used as another embodiment of the present invention.

FIG. 11 is block schematic diagram showing a graphic display system as another embodiment of the present invention. In this embodiment, a separate background processing unit 6 outputs background data of the graphic display system. Further, a separate background ROM 7 is provided out of the graphic display system. In this way, a MUX 53*f* receives background pixel data from separate background processing unit 6.

Figure 12:
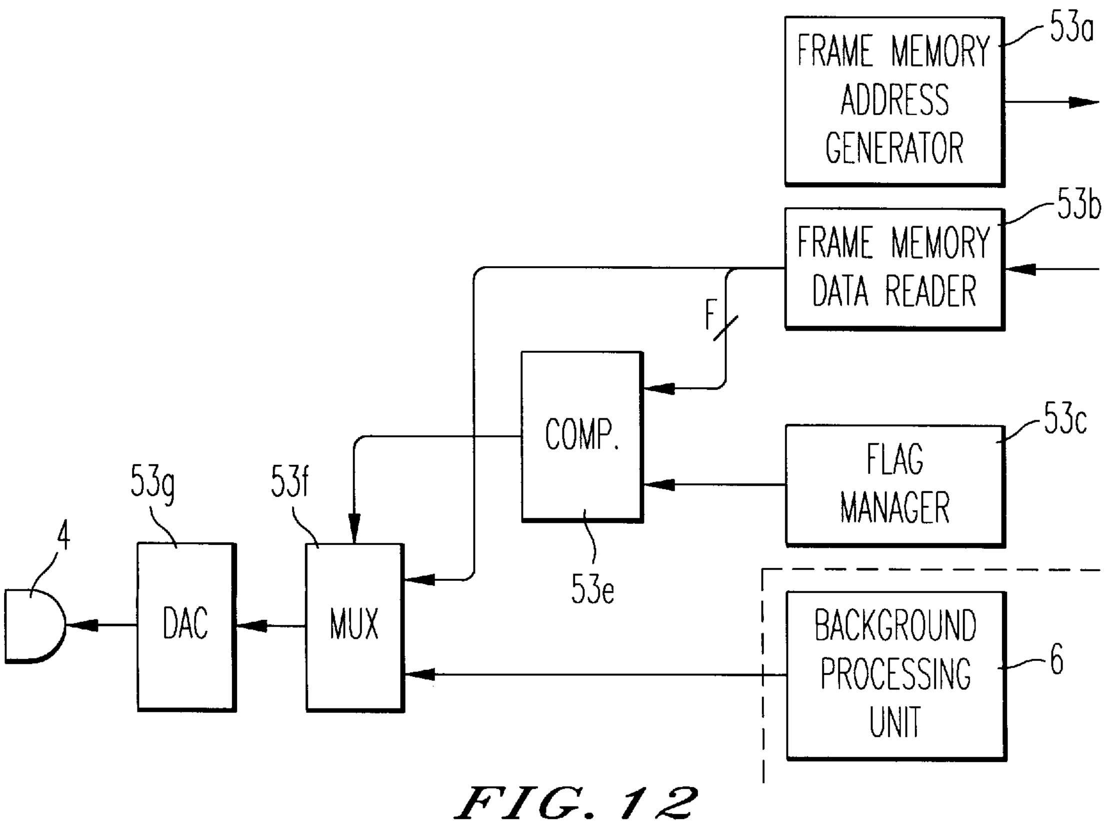
FIG. 12 is a block schematic diagram showing another graphic controller of an embodiment of the present invention.

FIG. 12 is block schematic diagram showing another graphic controller. As shown in FIG. 12, 53*a* is a frame memory address generation unit, 53*b* is a frame memory data .read unit, 53*c* is a flag manager, 53*e* is a comparator (COMP), 53*f* is a MUX and 53*g* is a DAC. In this graphic controller, a background processor 6 is formed as a separate element from the graphic controller.

In view of the foregoing drawbacks in the background graphic controlling processor, one object that the present invention achieves is providing a novel graphic controlling processor that has enough time for displaying a graphic image with a high graphic quality.

Obviously, numerous modifications and variations of the present invention are possible in light of the above teachings. It is therefore to be understood that within the scope of the appended claims, the invention may be practiced otherwise than as specifically described herein.

The entire disclosure of Japanese Patent Application No. 08-030494 filed on Feb. 19, 1996, including specification, claims, drawings and summary are incorporated herein by reference in its entirety.

What is claimed as new and is desired to be secured by Letters Patent of the United States is:

1. A graphic controlling processor for displaying a graphic image, comprising:

a frame memory for storing graphic data for displaying a graphic image, the frame memory being divided into a predetermined number of territories;

a graphic controller for controlling to display the graphic image based on the graphic data, and to control clearing of the frame memory;

wherein at least one control flag is added to the graphic data for differentiating a frame number; and wherein the graphic data is cleared from one of each of the predetermined territories in one frame cycle based on the at least one control flag.

2. The graphic controlling processor according to claim 1, wherein the graphic controller outputs background data instead of graphic data having no given control flag.

3. The graphic controlling processor according to claim 1, wherein the frame memory is divided into four predetermined territories.

4. The graphic controlling processor according to claim 1, wherein a number of the control flags is equal to the predetermined number of territories.

5. The graphic controlling processor according to claim 4, wherein the frame memory is divided into four predetermined territories.

6. A graphic controlling processor for displaying a graphic image, comprising:

a flag adding unit for adding at least one control flag to graphic data for displaying a graphic image, wherein the control flag differentiates frame numbers;

a graphic controlling unit for displaying the graphic data read out from a memory by the at least one control flag;

a memory clearing unit for clearing a part of the memory based on the at least one control flag differentiating frame numbers in one frame cycle.

7. The graphic controlling processor according to claim 6, wherein the graphic controller outputs background data instead of graphic data having no given control flag.

8. The graphic controlling processor according to claim 6, wherein the frame memory is divided into four predetermined territories.

9. The graphic controlling processor according to claim 6, wherein a number of the control flags is equal to the predetermined number of territories.

10. The graphic controlling processor according to claim 9, wherein the frame memory is divided into four predetermined territories.

* * * * *